UNITED STATES PATENT OFFICE.

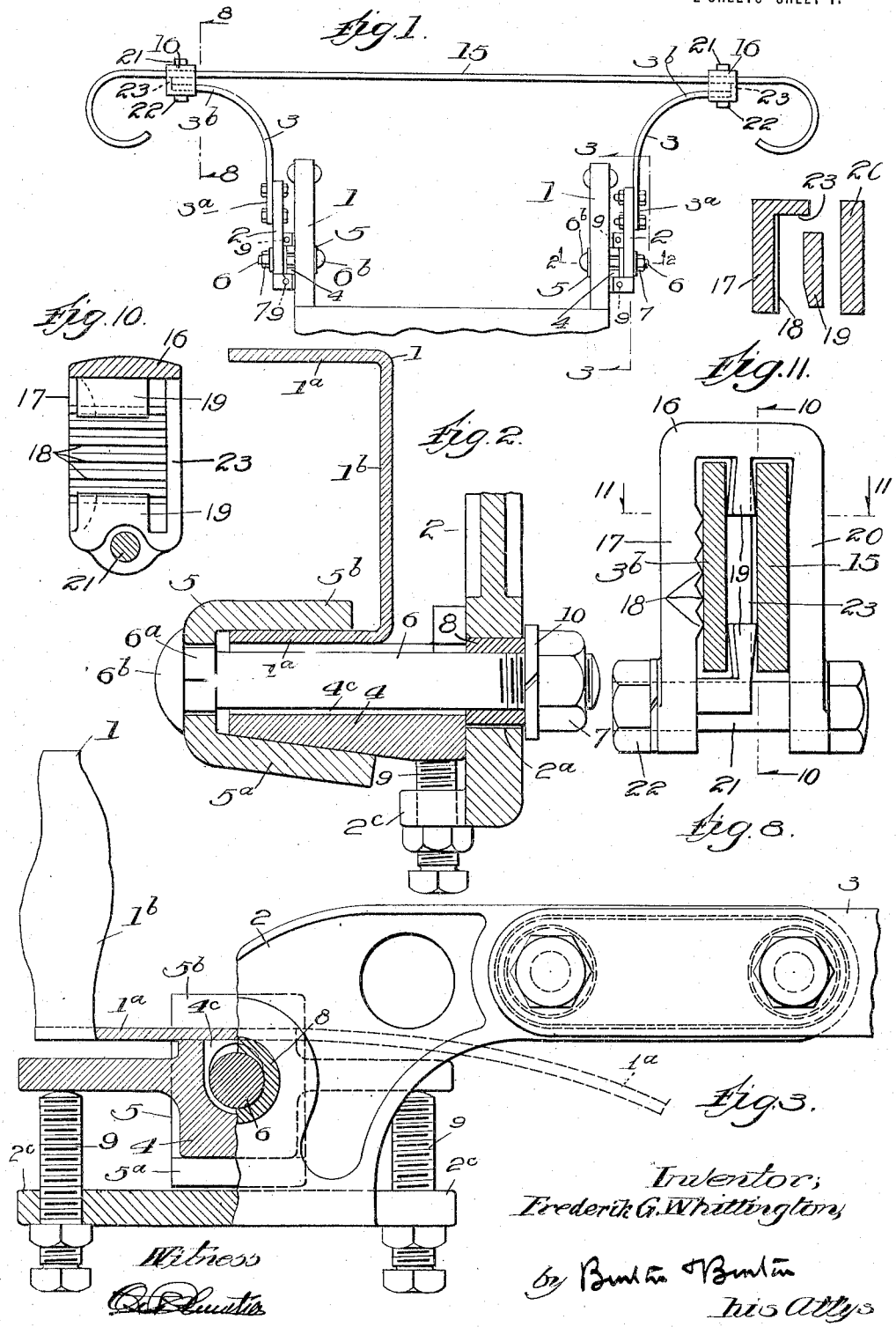

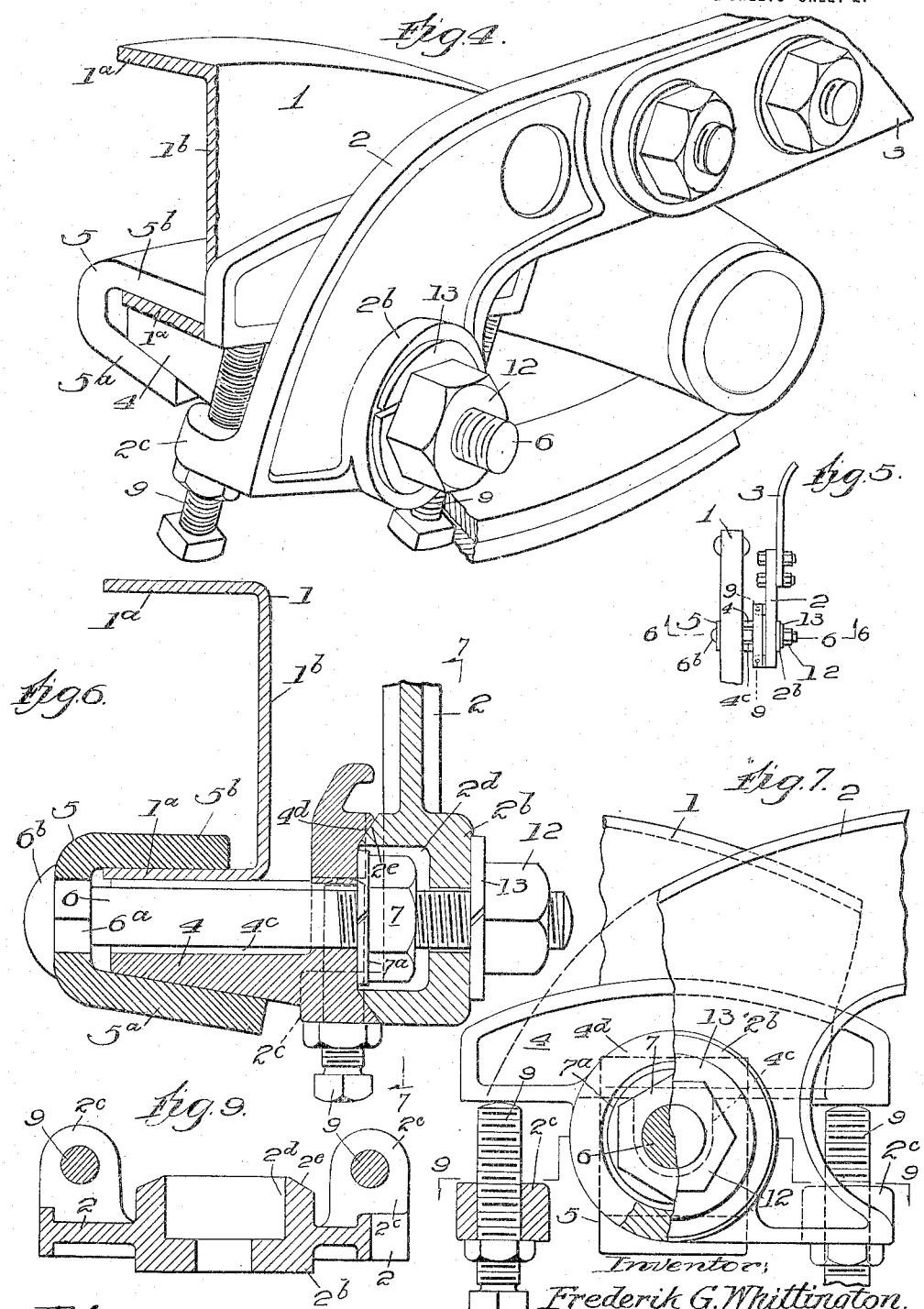

FREDERIK G. WHITTINGTON, OF CHICAGO, ILLINOIS, ASSIGNOR TO STEWART-WARNER SPEEDOMETER CORPORATION, OF CHICAGO, ILLINOIS, A CORPORATION OF VIRGINIA.

VEHICLE-BUMPER.

1,361,429.

Specification of Letters Patent.

Patented Dec. 7, 1920.

Application filed September 4, 1919, Serial No. 321,577. Renewed May 14, 1920. Serial No. 381,493.

*To all whom it may concern:*

Be it known that I, FREDERIK G. WHITTINGTON, a citizen of the United States, and a resident of the city of Chicago, county of Cook, and the State of Illinois, have invented certain new and useful Improvements in Vehicle-Bumpers, of which the following is a specification, reference being had to the accompanying drawings, forming a part thereof.

The purpose of this invention is to provide an improved construction of a means of attachment for a vehicle bumper. It consists in the elements and features of construction shown and described as indicated in the claims.

In the drawings:

Figure 1 is a plan view of the bumper embodying this invention shown attached to the side bars of the vehicle which it is to serve.

Fig. 2 is a detail section at the line, 2—2, on Fig. 1, upon a large scale.

Fig. 3 is a section at the line, 3—3, on Fig. 1.

Fig. 4 is a perspective view of a portion of the structure comprising the forward end of the vehicle side bar to which the bumper is attached and the adjacent portions of the bumper structure, consisting of the bumper supporting arm and coupling or attaching member.

Fig. 5 is a direct plan view of the parts shown in Fig. 4.

Fig. 6 is a section at the line, 6—6, on Fig. 5.

Fig. 7 is a section at the line, 7—7, on Fig. 6.

Fig. 8 is a detail section at line 8—8 on Fig. 1.

Fig. 9 is a detail section at line 9—9 on Fig. 7.

Fig. 10 is a detail section at line 10—10 on Fig. 8.

Fig. 11 is a detail section at line 11—11 on Fig. 8.

In the drawings, 1, 1, represent the side bars of the vehicle to which the bumper embodying this invention is to be attached, these side bars being shown in the common or most familiar form of channel bars having upper and lower end flanges, $1^a$, $1^a$, projecting horizontally inward from the vertical web, $1^b$, which faces outward. 2 is a coupling member or attaching member for the bumper and forms the rear end portion of the bumper supporting arm, 3, hereinafter more particularly described. 4, is a wedging member to which the coupling member, 2, is connected in a manner hereinafter described. 5, is a channel-shaped wedge-clamping member having its lower flange, $5^a$, oblique to the web and diverging from the opposite flange for coöperating with the wedging member, 4, for clamping the lower flange, $1^a$, of the vehicle side bar, 1, between the upper flange, $5^b$, of the clamping member, 5, and the upper surface of said wedging member. The wedging member, 4, has extending longitudinally through it an aperture, $4^c$, as the greater portion of the length of said aperture is merely channeled in the upper surface of said wedging member. A wedge clamping bolt, 6, having the squared shoulders, $6^a$, adjacent to the head, $6^b$, extends through a square aperture in the web of the member, 5, and through said groove and aperture in the wedge member, 4, and receives a wedge clamping nut, 7, outside the outer end of the member, 4, which nut being screwed onto the bolt crowds together the members, 4 and 5, so as to wedge the lower side of the clamping member, 5, downward away from the bolt, and thereby cause the lower flange, $1^a$, of the vehicle side bar, 1, to be tightly clamped between the upper side of the wedge member, 4, and the upper flange, $5^b$, of said clamping member, 5. The bumper coupling member, 2, is pivotally mounted upon the wedge member, 4, for vertical movement about its pivot to adjust the height of the bumper. The bolt, 6, may be utilized for retaining the coupling member in pivotal relation to the wedge member, 4, and said bolt may also be utilized as the pivot or fulcrum of said coupling member. In the form shown in Fig. 2, the bolt is made to serve both these purposes,—that is, it not only retains the coupling member in pivotal relation to the wedge member, 4, but serves as the pivot. In the form shown in Fig. 6 the bolt does not or need not serve as the pivot but does serve as the means of retaining the coupling member in pivotal relation to the wedge member. In the form shown in Fig. 2, a short bushing or spacing sleeve, 8, is passed over the end of the bolt outside of the wedging member, 4. The coupling member, 2, has an aperture, 2ª, adapting it to be passed onto the bushing sleeve, 8, and from a point immediately in the rear of this aperture, 2ª, said coupling member is curved downward and rearward, and at its rear lower end is provided with inwardly projecting lugs, 2ᶜ, 2ᶜ, which underhang the outer end portion of the wedging member, 4. Through these lugs adjusting bolts, 9, 9, are inserted and adapted to be set up against the lower surface of the outer end of said wedging member, 4, the parts being proportioned to space the lugs, 2ᶜ, 2ᶜ, downward away from the lower side of the wedging member sufficiently to allow range of oscillation of the coupling member about its pivotal axis at bolt, 6, to afford the necessary range of vertical adjustment of the bumper, this adjustment being effected, as will be understood, by varying the relative protrusion of the adjusting bolts, 9, withdrawing the rear bolt and screwing in the forward bolt for lowering the bumper bar or screwing in the rear bolts and withdrawing forward bolt for elevating it. The length of the spacing sleeve, 8, is made enough greater than the thickness of the coupling member, 2, at the aperture 2ª, so that screwing up the nut to effect the wedging action for gripping the flange, 1ª, cannot operate to clamp the coupling member, 2. In order that the bolt, 6, may serve as a means for retaining the coupling member, 2, in position alongside the wedging member, 4, a washer, 10, is interposed under the head of the bolt, that washer being of sufficient diameter to extend beyond the spacing sleeve, 8, and form a stop for the member, 2.

In the form shown in Fig. 6, the clamping nut, 7, is applied directly against the outer side of the wedging member, 4, with a split washer, 7ª, interposed as shown, if desired, and coupling member, 2, has an enlargement, 2ᵇ, in which at the inner side there is formed a housing chamber, 2ᵈ, in which the nut, 7, is inclosed when said clamping member is applied in position; and the wedging member, 4, has formed upon its outer side around the bolt aperture an annular boss or bead, 4ᵈ, having an interiorly beveled face on which the inner end, 2ᵉ, of the housing boss, 2ᵇ, of the coupling member, 2, seats when that member is applied as described, so as to house in the nut, 7. By this means the coupling member, 2, is substantially pivoted on the wedge member, 4, for adjustment around the axis of the bolt, but not upon the bolt, 6. The bolt in this form is extended out through the boss or enlargement, 2ᵇ, of the coupling member, 2, and provided with an exterior retaining nut, 12, which may have a split washer, 13, interposed between the nut and the outer side of the boss, 2ᵇ, for the usual purposes of such washer. It will be understood that the nut, 12, will be set up against the boss, 2ᵇ, so as to clamp the coupling member, 2, against the member, 4, as soon as the pivotal adjustment of the coupling member, 2, about the axis of the bolt, 6, has been effected by means of the adjusting screws, 9, 9, already described.

The bumper impact bar, 15, is made of flat steel stock wide enough to be vertically rigid while thin enough to be horizontally elastic so as to constitute a spring impact bar. This bar has its opposite ends curved rearwardly and inwardly so as to present rounded ends for impact and thereby adapted to glance off from the object encountered or cause the latter to glance off. The impact bar supporting arms, 3, 3, are formed of flat steel bars similar to the impact bar, 15, with the width vertical for vertical rigidity; and these bars, 3, are each bent in arcuate form making a curve of about 90 degrees between the rear end portion, 3ª, which is adapted to be secured flatly against the vehicle side bar, or specifically, in the construction shown to be secured to the coupler member, 2, which is secured against the vehicle side bar, and forward end portion, 3ᵇ, substantially at right angles to the rear end portion, 3ª, adapted to be presented flat-wise toward the rear face of the impact bar, 15, for securement thereto.

This securement is effected by means of a clamp-member, 16, formed with a jaw, 17, having serrations, 18, on its inner surface to engage the end, 3ᵇ, of the arm, 3, which is forced into place between this serrated surface and a pair of lugs, 19, cast integrally with the clamp member and slightly beveled or chamfered as indicated in Fig. 11, to facilitate insertion of the part, 3ᵇ. Between the opposite sides of these lugs, 19, and the other jaw, 20, the bumper bar, 15, is clamped by means of a bolt, 21, and its nut, 22, as seen in Fig. 11. The bar, 15, runs through the clamp but the insertion of the arm, 3ᵇ, is limited by a flange or wall, 23, extending transversely from the jaw, 17, and cast integrally therewith. In effect, the clamp, 16, thus becomes a part of the arm, 3, and accommodation of the bumper to different widths of vehicle frames is accomplished by sliding adjustment of the clamps, 16, along the bumper bar, 15, as required.

I claim:

1. In combination with a vehicle bumper comprising a flat bumper bar set vertically on edge and a pair of supporting arms bent in approximately quadrant curves each placed with one end adjacent to the bumper bar, a fitting for connecting each arm to the bar having a pocket dimensioned to receive the end portion of the arm and a clamping jaw extending parallel to the pocket and spaced therefrom to receive the bumper bar together with a clamping bolt connecting said jaw with the pocket portion of the fitting.

2. In the structure defined in claim 1 the fitting being formed as a casting and the pocket composed of a serrated jaw for engaging one face of the supporting arm, with a pair of holding lugs cast integrally in the fitting spaced away from said jaw and adapted to yield slightly in relation thereto and a second jaw opposite the first and also spaced from said lugs adapted to engage a face of the bumper bar, the clamping bolt extending through both jaws for compressing them upon the arm and the bar with the lugs interposed between said parts.

3. In the structure defined in claim 1 the fitting being formed as a casting and the pocket composed of a serrated jaw for engaging one face of the supporting arm with a pair of holding lugs cast integrally in the fitting spaced away from said jaw and adapted to yield slightly in relation thereto and a second jaw opposite the first and also spaced from said lugs adapted to engage a face of the bumper bar, the clamping bolt extending through both jaws for compressing them upon the arm and the bar with the lugs interposed between said parts, the initial spacing of the lugs from the serrated jaw being less than the thickness of the supporting arm and the lugs being yieldable to facilitate entry of the arm in the pocket thus formed.

4. In the structure defined in claim 1 the fitting being formed as a casting and the pocket composed of a serrated jaw for engaging one face of the supporting arm with a pair of holding lugs cast integrally in the fitting spaced away from said jaw and adapted to yield slightly in relation thereto and a second jaw opposite the first and also spaced from said lugs adapted to engage a face of the bumper bar, the clamping bolt extending through both jaws for compressing them upon the arm and the bar with the lugs interposed between said parts, the casting having a flange or web at one edge of the serrated jaw for limiting insertion of the arm in the pocket.

5. In combination with a vehicle bumper comprising a flat bumper bar set vertically on edge and a pair of supporting arms bent in approximately quadrant curves each placed with one end adjacent to the bumper bar, a fitting for connecting each arm to the bar comprising a pair of opposed jaws connected by a web portion adapted to extend over the upper edges of the bar and the arm, a yieldable lug associated with one jaw and spaced therefrom by a width slightly less than the thickness of the arm, the other jaw being spaced from said lug to accommodate the bumper bar between them and a clamping bolt connecting the two jaws adapted to pass below the bar and the arm.

6. In a vehicle bumper construction in combination with vehicle side bars each having a horizontal flange at one edge, a wedging member overhanging said flange, a channeled clamping member having one side tapered for coöperating with the wedging member between the latter and said flange with a clamping bolt engaging the wedge member and accommodated in the channel of the other, with a bumper coupling member pivotally attached to the wedging member for vertical adjustment of its arm which extends therefrom, and apertured to receive the end of the clamping bolt for securement thereby at adjusted position.

7. In the structure defined in claim 6 said coupling member having threaded portions extending proximate the channeled member at opposite sides of the pivotal mounting of the coupling member thereon and adjusting screws in said apertures impinging on the channeled member for angular adjustment of the coupling member about its pivot axis prior to its final securement by said clamping bolt.

8. In a vehicle bumper construction, in combination with vehicle side bars, each having a horizontal flange at one end, a bumper-supporting arm; a U-shaped clamp having its branches wedgingly divergent, one branch being lodged upon said flange and the other extending below the flange and projecting toward the plane of the side bar; a wedge member having its taper corresponding to the angle of divergence of the clamp arms interposed between the flange and the lower of said clamp arms, and a bolt extending loosely through the wedge member and through the neck of the U-shaped clamp, having stops outside said neck and outside the wedge member at the end opposite said neck, one of said stops being a nut whereby the clamp may be wedged to the flange, and said three parts, clamp, wedge member and bolt, are made rigid with the flange, and means for mounting the bumper arm on one of said three parts.

9. In the construction defined in claim 8 foregoing, the bumper-supporting arm being mounted upon the bolt.

10. In the construction defined in claim 8, foregoing, the bumper-supporting arm being pivotally mounted upon the bolt and provided with two adjusting screws for impinging upon the wedging member at opposite sides of the bolt axis for adjusting the said arm about the bolt.

11. In the construction defined in claim 8, foregoing, the nut being on the end of the bolt opposite the neck of the U, a sleeve on the bolt inside the nut, stopping against the wedge member for clamping action of the nut, the bumper-supporting arm being pivotally carried on said sleeve, the nut being provided with means of greater diameter than the sleeve for projecting there-beyond outside the said arm for retaining the arm on the sleeve.

12. In the construction defined in claim 8, foregoing, the bumper-supporting arm being mounted on the wedging member, its seat thereon encompassing the bolt, whereby it is pivoted about the axis of the bolt; a nut on the bolt for clamping it against its seat for securing it at adjusted position about said axis.

In testimony whereof I have hereunto set my hand at Chicago, Illinois, this 28th day of August, 1919.

FREDERIK G. WHITTINGTON.